United States Patent
Pasquero et al.

(10) Patent No.: US 9,715,489 B2
(45) Date of Patent: Jul. 25, 2017

(54) DISPLAYING A PREDICTION CANDIDATE AFTER A TYPING MISTAKE

(75) Inventors: Jerome Pasquero, Kitchener (CA); David Ryan Walker, Waterloo (CA); Gil Pinheiro, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/569,000

(22) Filed: Aug. 7, 2012

(65) Prior Publication Data

US 2013/0125037 A1    May 16, 2013

Related U.S. Application Data

(63) Continuation-in-part of application No. 13/373,356, filed on Nov. 10, 2011, now Pat. No. 8,490,008.

(51) Int. Cl.
G06F 17/27 (2006.01)
G06F 3/0488 (2013.01)
G06F 3/023 (2006.01)

(52) U.S. Cl.
CPC .......... *G06F 17/273* (2013.01); *G06F 3/0237* (2013.01); *G06F 3/04886* (2013.01); *G06F 17/276* (2013.01)

(58) Field of Classification Search
CPC .... G06F 3/0233; G06F 3/0234; G06F 3/0236; G06F 3/0237; G06F 17/273; G06F 17/276; G06F 3/04886
USPC ................................. 715/773, 710
See application file for complete search history.

(56) References Cited

U.S. PATENT DOCUMENTS

| | | |
|---|---|---|
| 3,872,433 A | 3/1975 | Holmes et al. |
| 4,408,302 A | 10/1983 | Fessel et al. |
| 5,261,009 A | 11/1993 | Bokser |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Martin et al. |
| 6,094,197 A | 7/2000 | Buxton et al. |

(Continued)

FOREIGN PATENT DOCUMENTS

| | | |
|---|---|---|
| CA | 2688204 A1 | 7/2010 |
| CA | 2812457 A1 | 10/2013 |

(Continued)

OTHER PUBLICATIONS

"Features Included in the T-Mobile G1", http://www.t-mobileg1.com/T-Mobile-G1-Features.pdf, 2009.

(Continued)

*Primary Examiner* — Ajay Bhatia
*Assistant Examiner* — Justin R Blaufeld
(74) *Attorney, Agent, or Firm* — Fish & Richardson P.C.

(57) ABSTRACT

A method includes receiving an input string from a virtual keyboard, generating at least one string based on the input string, where the input string is not a substring of the generated string, responsive to a determination that the generated string was previously generated based on the input string, selecting a candidate character associated with the input string and with the generated string, and displaying the generated string at a location on the virtual keyboard that is associated with the selected candidate character.

15 Claims, 12 Drawing Sheets

(56) References Cited

U.S. PATENT DOCUMENTS

| | | |
|---|---|---|
| 6,223,059 B1 | 4/2001 | Haestrup |
| 6,226,299 B1 | 5/2001 | Henson |
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1 | 9/2003 | Brand |
| 6,646,572 B1 | 11/2003 | Brand |
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,530,031 B2 | 5/2009 | Iwamura et al. |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,461,527 B2 | 6/2013 | Nakahira et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 8,543,934 B1 | 9/2013 | Thorsander et al. |
| 2002/0080186 A1 | 6/2002 | Frederiksen |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0046641 A1 | 3/2007 | Lim |
| 2007/0061753 A1 | 3/2007 | Ng et al. |
| 2007/0074131 A1 | 3/2007 | Assadollahi |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0263932 A1 | 11/2007 | Bernardin et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1* | 10/2008 | Idzik .......................... 345/168 |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0247112 A1 | 10/2009 | Lundy et al. |
| 2009/0251410 A1 | 10/2009 | Mori et al. |
| 2009/0254818 A1* | 10/2009 | Jania et al. ................... 715/257 |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0197352 A1 | 8/2010 | Runstedler et al. |
| 2010/0199176 A1 | 8/2010 | Chronqvist |
| 2010/0225599 A1* | 9/2010 | Danielsson et al. .......... 345/173 |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |

(56) References Cited

U.S. PATENT DOCUMENTS

| | | |
|---|---|---|
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1* | 5/2011 | Kim ............... G06F 3/0237 715/808 |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0260829 A1 | 10/2011 | Lee |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0063356 A1 | 3/2013 | Martisauskas |
| 2013/0066896 A1* | 3/2013 | Mehanna ....... G06F 17/30395 707/767 |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125035 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285913 A1 | 10/2013 | Griffin et al. |
| 2013/0285914 A1 | 10/2013 | Pasquero et al. |
| 2013/0285935 A1 | 10/2013 | Thorsander |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 A1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-68963 A | 4/2012 |
| KP | KR20120030652 A | 3/2012 |
| WO | 03/029950 A2 | 4/2003 |
| WO | 03/054681 A1 | 7/2003 |
| WO | 04/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |

(56) References Cited

FOREIGN PATENT DOCUMENTS

| WO | 2007/134433 A1 | 11/2007 |
| WO | 2008/030974 A1 | 3/2008 |
| WO | WO2008/057785 A2 | 5/2008 |
| WO | 2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010/035574 A1 | 4/2010 |
| WO | WO 2010035574 A1 * | 4/2010 |
| WO | 2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. In a PDF or any other text format on a touch based mobile/tablet device, IP.com Journal, Mar. 1, 2011, XP013142665, (10 pages).
Droid X by Motorola © 2010 Screen shots.
Droid X by Motorola © 2010 User Manual (72 pages).
European Search Report dated Feb. 28, 2011, issued in European Patent Application No. 10160590.5.
Extended European Search Report dated Aug. 24, 2012, issued in European Application No. 12166115.1 (5 pages).
Extended European Search Report dated Aug. 31, 2012, issued in European Application No. 12166170.6 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/EP2012/057944, on Oct. 12, 2012, (10 pages).
International Search Report and Written Opinion issued in International Application No. PCT/IB2011/003273, on Jun. 14, 2012, (8 pages).
International Search Report and Written Opinion mailed Sep. 10, 2012, issued for International Application No. PCT/EP2012/057945 (11 pages).
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://supportsprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://supportsprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No, 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
U.S. Office Action for Appl. No. 12/764,298, dated Jul. 20, 2012, (38 pages).
U.S. Office Action for U.S. Appl. No. 13/482,705, dated Aug. 7, 2012, (10 pages).
User Guide Samsung Moment(TM) with Google(TM), dated Dec. 4, 2009 (122 pages).
User Guide Samsung Moment(TM) with Google(TM), dated Mar. 2, 2010 (218 pages).
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).

(56) References Cited

OTHER PUBLICATIONS

Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
Swype Product Features, accessed online at http://www.swype.com/about/specifications/ on Feb. 25, 2013 (2 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
Canadian Office Action dated Jun. 2, 2014, issued in Canadian Application No. 2,812,033, (3 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Jun. 2, 2014, issued in European Application No. 12166142.5, (4 pages).
European Examination Report dated Jun. 3, 2014, issued in European Application No. 12172458.7, (5 pages).
Final Office Action dated Apr. 11, 2014, issued in U.S. Appl. No. 13/447,704, (18 pages).
Final Office Action dated Mar. 26, 2014, issued in U.S. Appl. No. 13/564,697, (9 pages).
Office Action dated Apr. 11, 2014, issued in U.S. Appl. No. 13/481,171, (29 pages).
Office Action dated Apr. 11, 2014, issued in U.S. Appl. No. 13/572,232, (38 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Jun. 11, 2014, issued in U.S. Appl. No. 13/563,182, (12 pages).
Office Action dated Mar. 26, 2014, issued in U.S. Appl. No. 13/548,469, (46 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).
Canadian Office Action dated Aug. 8, 2012, issued in Canadian Application No. 2,688,204 (3 pages).
Canadian Office Action dated Mar. 27, 2013, issued in Canadian Application No. 2,737,314 (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Dec. 21, 2012, issued in European Application No. 12173818.1, (8 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Dec. 13, 2013, issued in U.S. Appl. No. 13/572,232, (30 pages).
Final Office Action dated Feb. 10, 2014, issued in U.S. Appl. No. 13/485,723, (19 pages).
Final Office Action dated Jul. 25, 2013, issued in U.S. Appl. No. 13/560,796 (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).

(56) References Cited

OTHER PUBLICATIONS

Final Office Action dated Oct. 26, 2011, issued in U.S. Appl. No. 12/362,536 (21 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (20 pages).
Office Action dated Dec. 6, 2013, issued in U.S. Appl. No. 13/564,697, (22 pages).
Office Action dated Jan. 31, 2014, issued in U.S. Appl. No. 13/534,101, (38 pages).
Office Action dated Jun. 8, 2011, issued in U.S. Appl. No. 12/362,536 (19 pages).
Office Action dated Mar. 12, 2014, issued in U.S. Appl. No. 13/616,423, (21 pages).
Office Action dated May 30, 2013, issued in U.S. Appl. No. 13/572,232 (49 pages).
Office Action dated Nov. 22, 2013, issued in U.S. Appl. No. 13/447,704, (47 pages).
Office Action dated Oct. 17, 2013, issued in U.S. Appl. No. 13/485,723, (28 pages).
PCT International Search Report and Written Opinion dated Nov. 8, 2012, issued in International Application No. PCT/CA2012/050405 (12 pages).
Through the Magic Window—Magic Window word processor for the Apple II, Artsci Publishing, 1980, http://www.artscipub.com/history/magicwindow, accessed May 21, 2013 (5 pages).
Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty, dated Jan. 29, 2012).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,736, filed Aug. 31, 2012, (44 pages).
U.S. Appl. No. 13/601,864, filed Aug. 31, 2012, (23 pages).
U.S. Appl. No. 13/601,898, filed Aug. 31, 2012, (28 pages).
Canadian Office Action in Canadian Application No. 2793629, dated Jul. 8, 2014, 4 pages.
U.S. Appl. No. 13/554,583.
U.S. Appl. No. 13/554,436.
U.S. Appl. No. 13/494,794.
U.S. Appl. No. 13/459,732.
Office Action issued in Canadian Application No. 2,793,629, dated Jul. 5, 2016, 5 pages.

* cited by examiner

DISPLAYING A PREDICTION CANDIDATE AFTER A TYPING MISTAKE

RELATED APPLICATION DATA

This application claims the benefit as a continuation-in-part of co-pending U.S. application Ser. No. 13/373,356, filed Nov. 10, 2011, the subject matter of which is hereby incorporated by reference in its entirety.

FIELD

Example embodiments disclosed herein relate generally to input methodologies for electronic devices, such as handheld electronic devices, and more particularly, to methods for receiving predictive text input and generating a string for electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DETAILED DESCRIPTION

Figure 1:
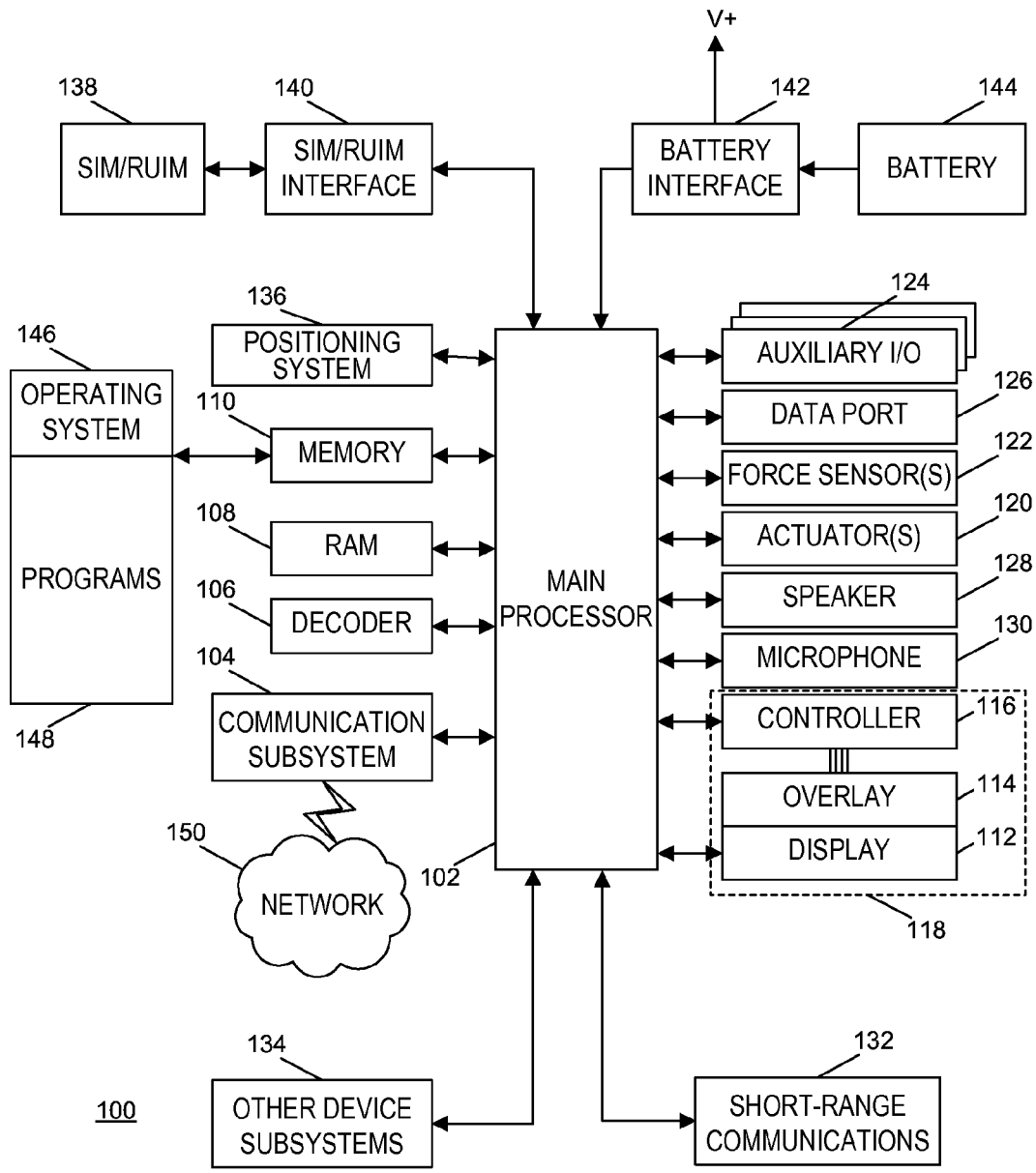
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, such as a wired communication device (for example, a laptop computer having a touchscreen) or a mobile/handheld wireless communication device such as a cellular phone, smartphone, wireless organizer, personal digital assistant, wirelessly enabled notebook computer, tablet, or a similar device. The electronic device can also be an electronic device without wireless communication capabilities, such as a handheld electronic game device, digital photograph album, digital camera, or other device.

Predictive text input solutions have been introduced for assisting with input on an electronic device. These solutions include predicting which word a user is entering and offering a suggestion for completing the word. Some of these solutions require the user to input most or all of the characters in a word before the solutions suggest (or present a prediction of) the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

Accordingly, example embodiments described herein permit the user of an electronic device to input characters without diverting attention from the keyboard and subsequently refocusing.

Throughout the specification and the claims, the terms "string" and "string of characters" are used interchangeably. Use of the indefinite article "a" or "an" in the specification and the claims is meant to include one or more than one of the feature that it introduces, unless otherwise indicated. Thus, the term "a string of characters" as used in "generating a string of characters" can include the generation of one or more than one string. Similarly, use of the definite article "the", or "said," particularly after a feature has been introduced with the indefinite article, is meant to include one or more than one of the feature to which it refers (unless otherwise indicated). Therefore, the term "the generated string" as used in "displaying the generated string" includes displaying one or more generated strings.

In one embodiment, a method is provided that includes receiving an input string from a virtual keyboard, generating at least one string based on the input string, where the input string is not a substring of the generated string, responsive to a determination that the generated string was previously generated based on the input string, selecting a candidate character associated with the input string and with the generated string, and displaying the generated string at a location on the virtual keyboard that is associated with the selected candidate character. In one embodiment, the method also includes, responsive to a determination that the generated string was not previously generated based on the input string, receiving a new input character, and associating the new input character with the input string and the generated string.

This example embodiment, as well as those described below permit the user of an electronic device to input a string of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

Furthermore, if the user makes one or more mistakes while typing, the systems and methods described herein can recognize the mistakes and accordingly adjust the locations on the keyboard where the prediction options are provided. The typing mistakes can be spelling mistakes, typographical errors, or any other type of mistake as a result of which the typed word does not match the corresponding word in the dictionary.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen 118 at a location associated with the character.

Touchscreen 118 is connected to and controlled by main processor 102. Accordingly, detection of a touch event and/or determining the location of the touch event can be performed by main processor 102 of electronic device 100. A touch event includes, in some embodiments, a tap by a finger, a swipe by a finger, a swipe by a stylus, a long press by finger or stylus, a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and that are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
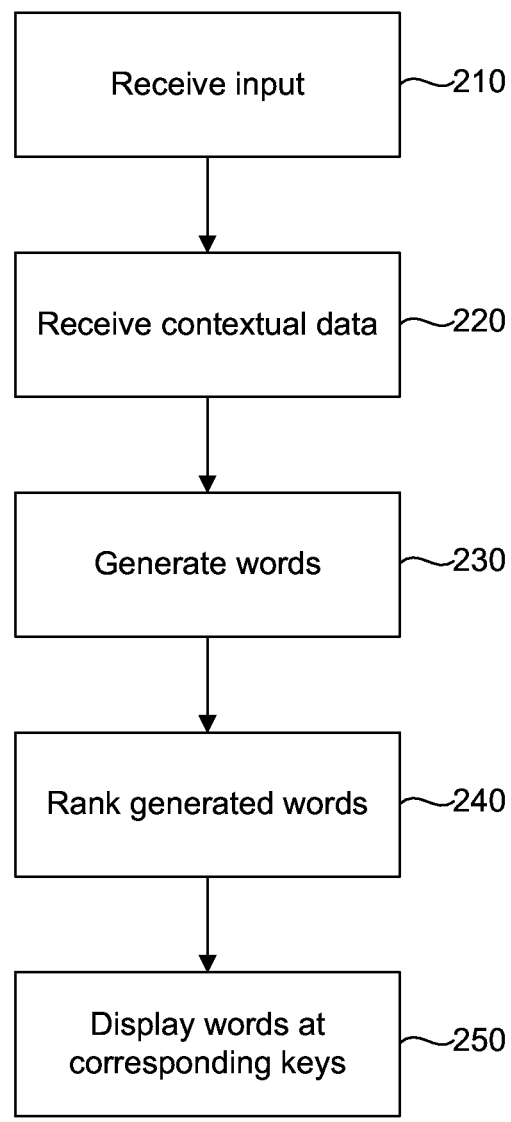
FIG. 2 is a flowchart illustrating an example method for predicting a selected string, consistent with embodiments disclosed herein.

FIG. 2 is a flowchart illustrating an example method 200 for predicting a string of characters, consistent with example embodiments disclosed herein. As used herein, a predictor (such as a predictive algorithm, program, firmware, or a dedicated hardware module) includes a set of instructions that when executed by a processor (e.g., main processor 102), can be used to disambiguate received ambiguous text input and provide various options, such as a string of characters (for example, words or phrases, acronyms, names, slang, colloquialisms, abbreviations, or any combination thereof) that a user might be contemplating. A predictor can also receive otherwise unambiguous text input and predict string of characters potentially contemplated by the user based on several factors, such as context, frequency of use, and others as appreciated by those skilled in the field.

In an example embodiment, the predictor is a program 146 residing in memory 110 of electronic device 100. Accordingly, method 200 includes a predictor for generating a generated string of characters corresponding to the input string of characters. It can be appreciated that while the example embodiments described herein are directed to a predictor program executed by a processor, the predictor can be executed, for example, by a virtual keyboard controller.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like. The inputted character can be displayed in an input field (for example, input field 330 further described below in FIGS. 3A-3C) that displays the character the user inputs using the virtual keyboard.

At block 230, the processor generates one or more generated strings of characters such as words or phrases, acronyms, names, slang, colloquialisms, abbreviations, or any combination thereof based on the input received in block 210. The generated string of characters includes, for example, a string of characters that is stored in a dictionary (for example, a word or an acronym) of a memory of the electronic device, a string of characters that was previously inputted by the user (for example, a name or acronym), a string of characters based on a hierarchy or tree structure, a combination thereof, or any string of characters that is selected by a processor based on defined arrangement.

In some embodiments, the processor can use contextual data for generating a string of characters (block 220). Contextual data considers the context of characters in the input field. Contextual data can include information about, for example, a string of characters previously inputted by the user, grammatical attributes of the characters inputted in the input field (for example, whether a noun or a verb is needed as the next string of characters in a sentence), or any combination thereof. For example, if the string of characters "the" has already been inputted into display, the processor can use the contextual data to determine that a noun—instead of a verb—will be the next string of characters after "the". Likewise, if the string of characters "Guy Lafleur played in the National Hockey" was inputted, based on the context, the processor can determine that the subsequent string of characters is likely to be "League". Using the contextual data, the processor can also determine whether an inputted character was incorrect. For example, the processor can determine that the inputted character was supposed to be a "w" instead of an "a", given the proximity of these characters on a QWERTY virtual keyboard.

Processor 102 can also include an affix as part of the string of characters, such as an adverb ending, an adjective ending, different verb tenses, and the like, or any other change to make a complete string of characters. Processor 102 can also use the received input to generate affixes, such as plural endings or plural forms. Any known predictive technique or software can be used to process the received input and the contextual data in generating string of characters at block 230.

In some example embodiments, the string of characters generated at block 230 can begin with the same character (or characters) received as input at block 210. In other words, the characters received as input at block 210 can constitute a prefix to the generated string of characters. For example, if the characters "pl" have been received as input using a virtual keyboard, these characters will be received by the processor as the input. In these embodiments, the string of characters generated at block 220 would all begin with "pl", such as "please" or "plot." There is no limit on the length of a generated string of characters. Regarding affixes, if the user has input the characters "child", for example, the affixes generated at block 230 could include "-ren", to make the string of characters "children", or "-ish", to make the string of characters "childish".

In some example embodiments, the string of characters generated at block 230 can simply include the same characters received as input at block 210. For example, if the received input is an "x," the processor may generate "example" or "xylophone" as the string of characters. Such strings of characters can be generated, for example, using the contextual data.

In another example embodiment, if input has not been received or a delimiter (such as a <SPACE>) has been used, the generated string of characters can be placed on the first letter of the generated string of characters.

Next, at block 240, the generated string of characters from block 230 can be ranked. The ranking reflects the likelihood that a candidate string of characters might have been intended by the user, or might be chosen by a user compared to another candidate string of characters.

In some embodiments, contextual data can be included in the ranking at block 240. In some embodiments, the electronic device can be configured to rank nouns or adjectives higher based on the previous inputted string of characters. If the inputted string of characters is suggestive of a noun or adjective, the processor, using the contextual data from block 220, can rank the nouns or adjectives corresponding to what the user is typing can be ranked higher at block 240. In an additional embodiment, string of characters including adjective affixes (such as "-ish" or "-ful"), phrases, plurals, or combinations thereof can also be ranked. Contextual data can increase the likelihood that the higher ranked generated string of characters is intended by a user. In some embodiments, contextual data can include information about which programs or applications are currently running or being used by a user. For example, if the user is running an email application, then string of characters associated with that user's email system, such as string of characters from the user's contact list, can be used to determine the ranking. N-grams, including unigrams, bigrams, trigrams, and the like, can be also used in the ranking of the strings of characters. Alternatively, the geolocation of the electronic device or user can be used in the ranking process. If, for example, the electronic device recognizes that a user is located at his/her office, then strings of characters generally associated with work can be ranked higher in the list. If, on the other hand, the device determines a user is at the beach, then strings of characters generally associated with the beach can be ranked higher in the list.

At block 240, the processor determines which of the string of characters to display based on the ranking. For example, higher ranked strings of characters are more likely to be determined that they should be displayed. A ranker (such as a ranking algorithm, program, firmware, or a dedicated hardware block) includes a set of instructions that when executed by a processor (for example, main processor 102), can be executed to determine ranking in this regard. In some embodiments, the ranker is a program 146 residing in memory 110 of electronic device 100.

At block 250, the determined string of characters is displayed at a location on the keyboard corresponding to a candidate character, predicted as the next character in a word that the user might input. For instance, if a user inputs "pl", the word "please" would be displayed on the key for the letter "e"—the candidate character for that word. Similarly, the word "plus" would also be displayed, but on the key for the letter "u"—another candidate character. The candidate character can be any alphanumeric character, such as a letter, number, symbol, punctuation mark, and the like.

In some embodiments, the generated string of characters is displayed at or near keys on the virtual keyboard associated with the candidate characters. Its placement at or near a key can depend, for instance, on the size of the word or the number of nearby candidate characters and the size of their associated string of characters.

The string of characters can be displayed in a manner that will attract the user's attention. In some embodiments, a displayed string of character's appearance can be enhanced or changed in a way that makes the string of characters more readily visible to the user. For example, displayed strings of characters can be displayed with backlighting, highlighting, underlining, bolding, italicizing, using combinations thereof, or in any other way for making the displayed string of characters more visible.

When identifying the string of characters for display at block 250, the processor can limit the displayed string of characters to the top few or choose among the higher ranked strings of characters. For example, if two strings of characters are both ranked high, and these strings of characters would otherwise be displayed at the same key, the electronic device could be configured to display only the highest ranked generated string of characters. In other embodiments, both strings of characters could be displayed at or around the same key, or one string of characters is displayed at one key while the second string of characters is displayed at another key. In some example embodiments, the processor can take into account the display size to limit the number of generated strings of characters.

In some embodiments, the ranking could be used to choose between string of characters that, when displayed on adjacent candidate characters, would overlap with each other (e.g., because of their respective lengths). In such a scenario, the electronic device could be configured to display the higher ranked string of characters on the keyboard. For example, if the string of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking string of characters that would be displayed on or around those keys. At block 250, it could be determined that "establishment" would be displayed fully, and no other string of characters would be placed at the "A" or "D" keys ahead of the first ranked string of characters "establishment." An alternative to displaying only the top ranked string of characters would be to use abbreviations or recognized shortened forms of the string of characters, effectively permitting a long string of characters to be displayed within or mostly within the boundaries of a single key simultaneously with other strings of characters on adjacent keys of a virtual keyboard.

In some embodiments, the problem of potentially overlapping strings of characters can be resolved, for example, by displaying some strings of characters at the top portions of the corresponding keys, and displaying other strings of characters at the bottom portions of the corresponding keys.

Figure 3A:
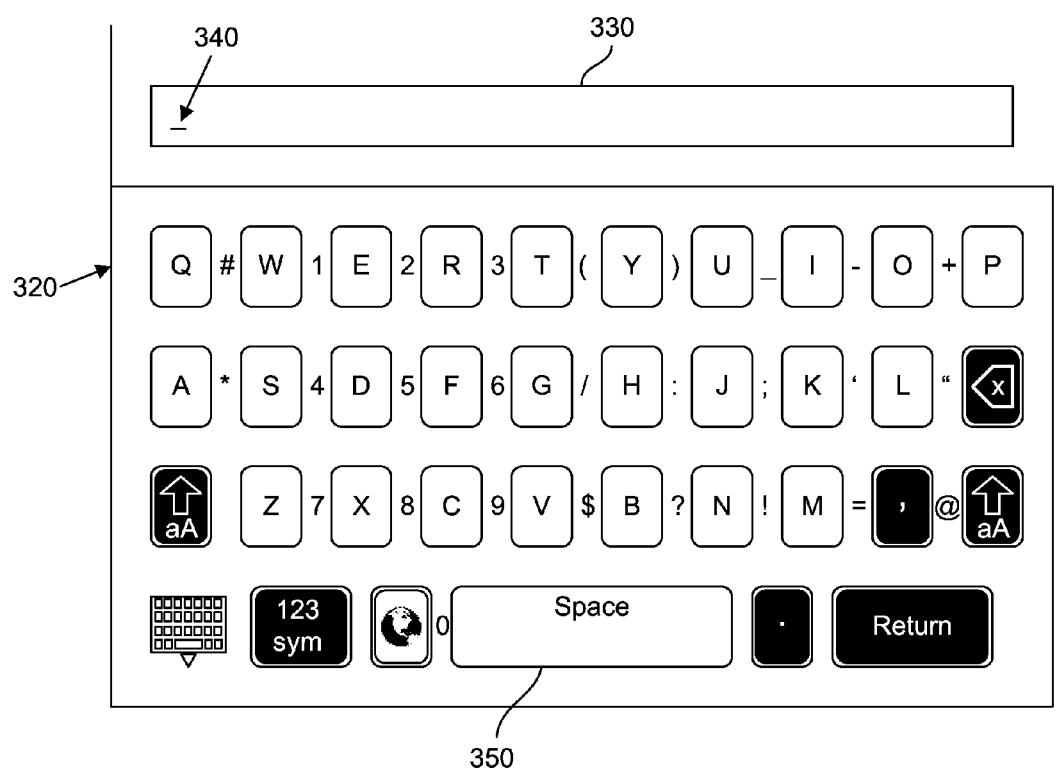
FIGS. 3A, 3B, 3C, and 3D show example front views of a touchscreen, consistent with embodiments disclosed herein.
Figure 3B:
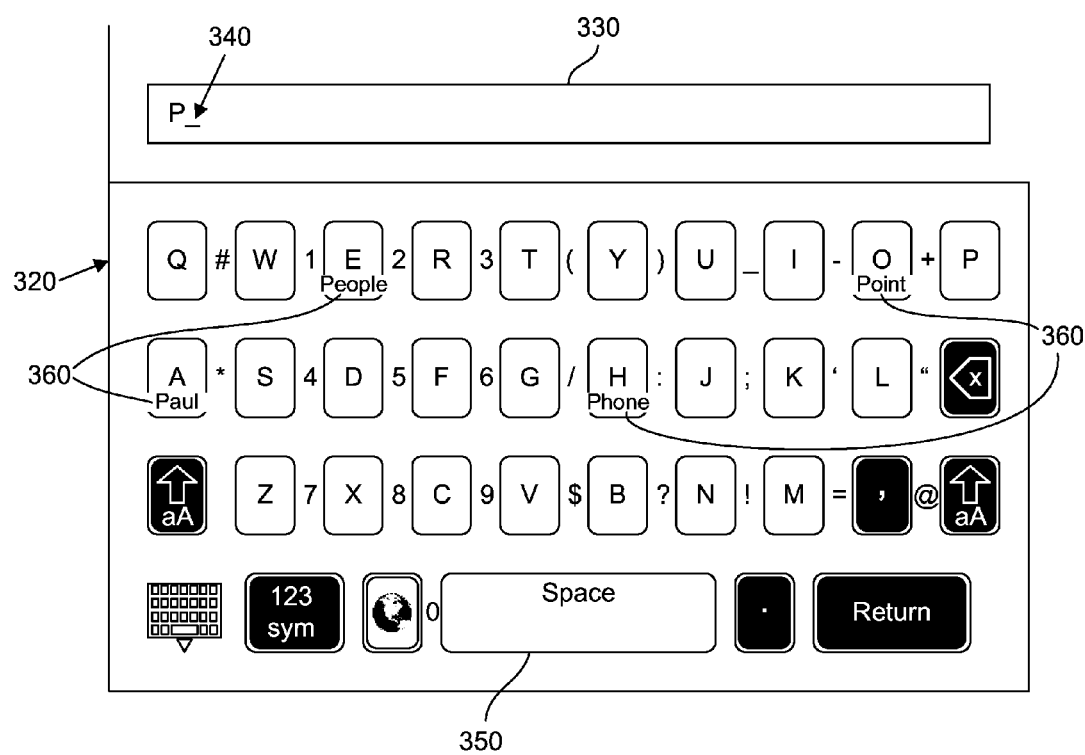
Figure 3C:
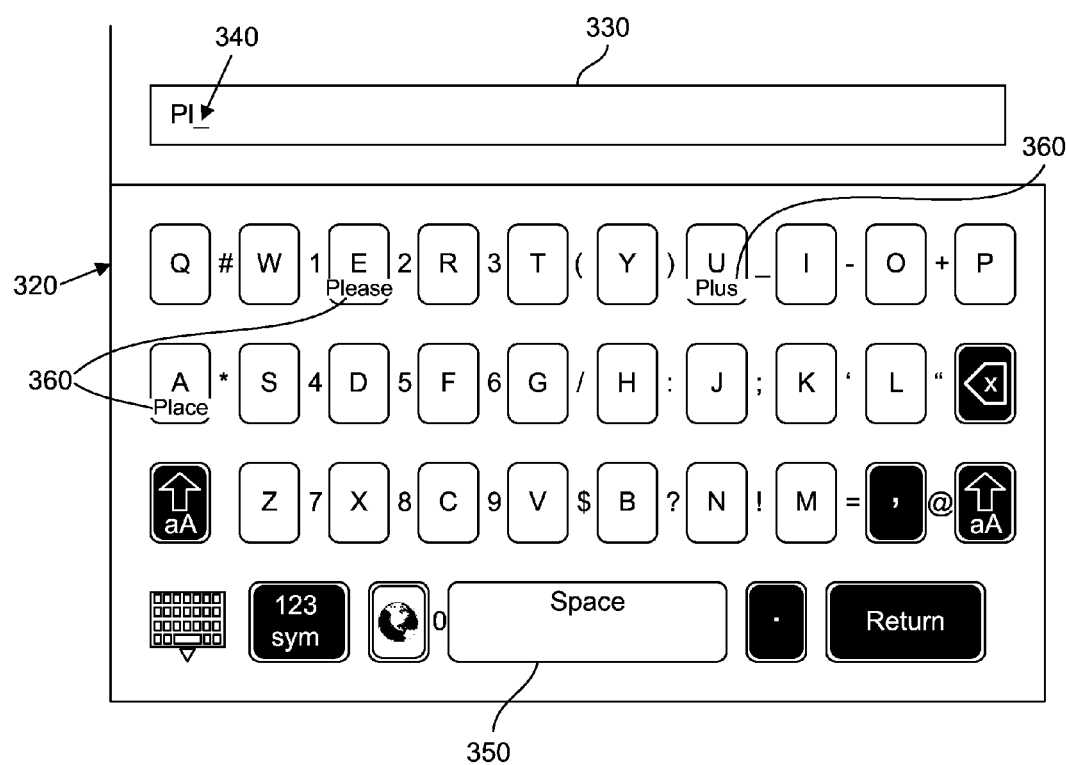

FIGS. 3A-3C illustrate a series of example front views of the touchscreen 118 having a virtual keyboard 320, consistent with example embodiments disclosed herein. Starting with FIG. 3A, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, virtual keyboard displays a string at a location on the keyboard corresponding to a candidate character that might be received as input from the user.

The examples and embodiments illustrated in FIGS. 3A-3C can be implemented with any string, such as words, phrases, acronyms, names, slang, colloquialisms, abbreviations, or any combination thereof.

As shown in FIG. 3A, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touchscreen 118 displays input field 330, which displays the characters the user inputs using virtual keyboard 320. Input field 330 includes a cursor 340, which can be an underscore (as shown) or any other shape, such as a vertical line. Cursor 340 represents the character space where a next inputted character, selected character, or selected string will be inserted.

As shown in FIG. 3B, when a user inputs a character (in this example, "P"), this character is displayed in input field 330, and cursor 340 moves to the character space where the next inputted character or word will be inserted. After the character is inputted, a predictor (such as, a predictive algorithm or a circuit) can generate a string 360 (for this embodiment) that all begin with the character "P". The generated string is displayed at a location on the keyboard corresponding to a candidate character that might be received as input from the user. As mentioned, generated strings 360 can be displayed at or near the key corresponding to the candidate characters (for example, under the respective A, E, H, and O keys of the virtual keyboard 320). Indeed, slightly shifting the display location of the generated strings can address overcrowding of candidate characters, effectively permitting more strings to be displayed.

In the example shown in FIG. 3B, "P" is received as input and a predictor generates several strings 360, which are displayed at keys corresponding to the candidate characters corresponding to each generated string. As shown in FIG. 3B, "People" is placed at the "E" key because the next letter after "P" of "People" is "E"; "Paul" will be place at the "A" key because the next letter after "P" of "Paul" is "A"; "Phone" will be placed at the "H" key because the next letter after "P" of "Phone" is "H"; and so on. It should be noted that any of the letters in the string can be upper case or lower case.

In the embodiment shown in FIG. 3C, "L" is the next input received by touchscreen, and the predictor generates several strings 360, which are displayed at keys corresponding to candidate characters (for example, under the respective A, E, and U keys of the virtual keyboard 320), for the current position of cursor 340, which, in this example, is the third character position, as shown in input field 330. In another embodiment, a generated string 360 can be presented such as to include the candidate character. For example, the string "Please" can be displayed so that the characters "Pl" are displayed before the "E" character on the "E" key, and the characters "ase" can be placed after the "E" character on the "E" key. Further, in this or other embodiments, the displayed "E" can be presented in a manner that differs from the "Pl" and "ase", thereby enabling the user to still recognize it as the "E" key while also making it readily visible so that the user can either input the generated string "Please" or input the character "E". The "E" can be capitalized or in lowercase. In other embodiments, an affix can be displayed at the key. Using the example of the string "Please" above, the "ase" could be displayed at the "E" key so the string fragment "-ease" or "-Ease" would appear.

If the user inputs a generated string, that string is placed in input field 330. This can be seen in FIG. 3D, where the user has inputted a generated string "Please," resulting in its placement in the input field. A space is inserted after the string if the user wants to input a new string. A user could input a generated string in various ways, including in a way that differs from a manner of inputting a character key. For example, to input a generated string, a user could use a finger or stylus to swipe the generated string. As used herein, swiping includes swiping the string itself or swiping or touching near the string. For the latter embodiment, the device can detect a swipe or touch near a string, be it a generated string or a predicted string (to be described below), and through the use of a predictor, determine the string the user intended to input. In another embodiment, the user could press a key for a predetermined period of time, such as a long press. That key can be, for example, the key corresponding to the candidate character of the string. So, if the string "Please" is intended to be inputted instead of "E", the electronic device 100 can be configured to require that the "E" key be pressed for a predetermined period of time to trigger the input of "Please".

Figure 3D:
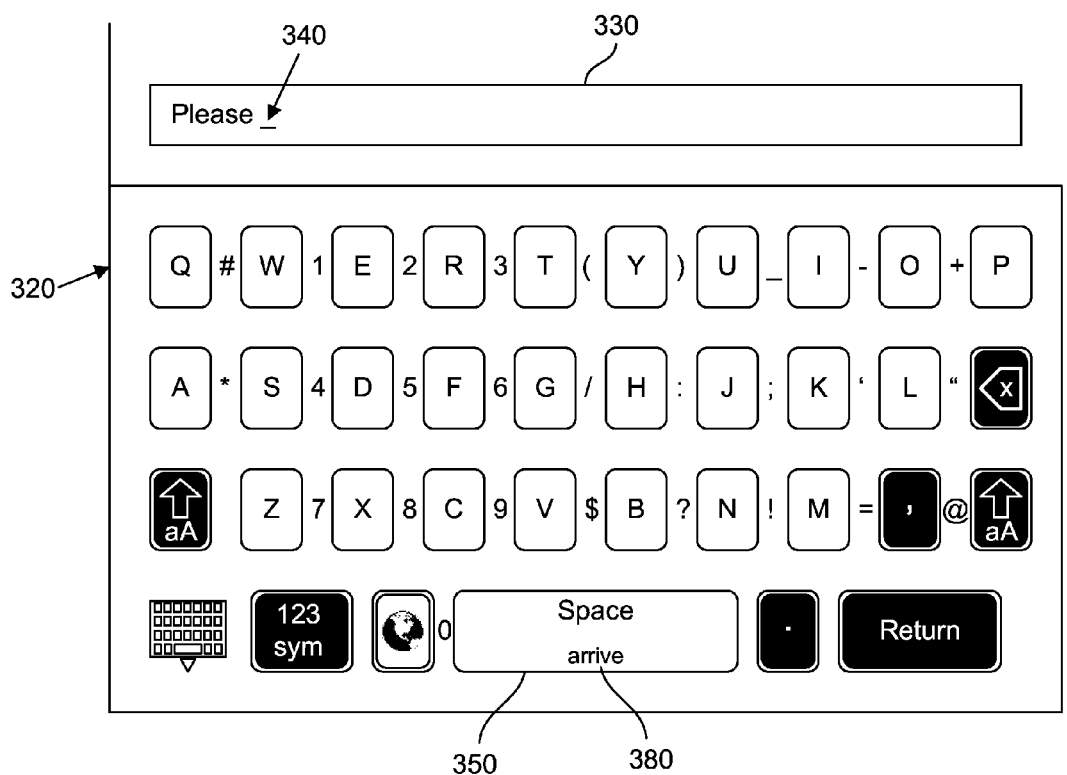

After a generated string 360 has been determined, as shown in FIG. 3D, a predicted string 380 can be displayed, shown here at space key 350. Predicted string 380 can differ from generated string 360 (as shown in FIGS. 3A-3C) and is the system's attempt to predict the next string a user might be contemplating. A predictor is used to determine predicted string 380. As with displayed generated string, predicted string 380 can be received as input in any number of ways, including receiving a swiping of the predicted string with a finger or stylus or receiving a pressing of a key (such as the space key or another designated key) for a predetermined period of time (long press).

Typing Mistakes

In some embodiments, the user inputs a string containing one or more mistakes, such as spelling mistakes or mistakes occurring due to accidental selections of a wrong key(s) on the virtual keyboard. In these embodiments, the predictor can still generate a string that corresponds to the correct form of the intended input. For example, if the user misspells the word "receive" and begins inputting the string "reci", or if the user makes a typo and inputs the string "recr" (given how closely "R" and "E" are positioned on the virtual keyboard), the predictor can generate a string "receive," even though neither "reci" nor "recr" are substrings of the string "receive". It should be noted that one string is considered a substring of another string if the second string contains the first string in its entirety, that is, the characters of the first string appear within the second string exactly as they appear in the first string: in the same sequence and without any additional characters between them. Thus, for example, "reci" is not a substring of "received" even though "received" contains all of the characters of "reci", because the sequence of the characters is not maintained: "c" is not immediately followed by "i".

Figure 4A:
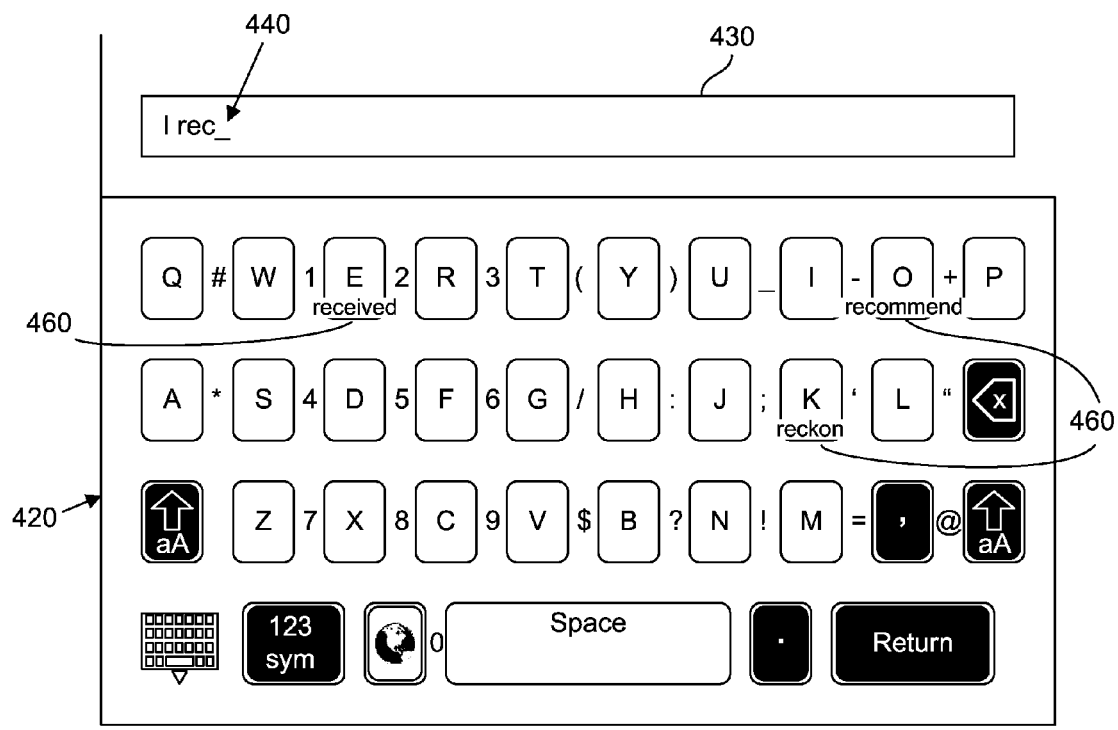
FIGS. 4A, 4B, and 4C show example front views of a touchscreen, consistent with embodiments disclosed herein.
Figure 4B:
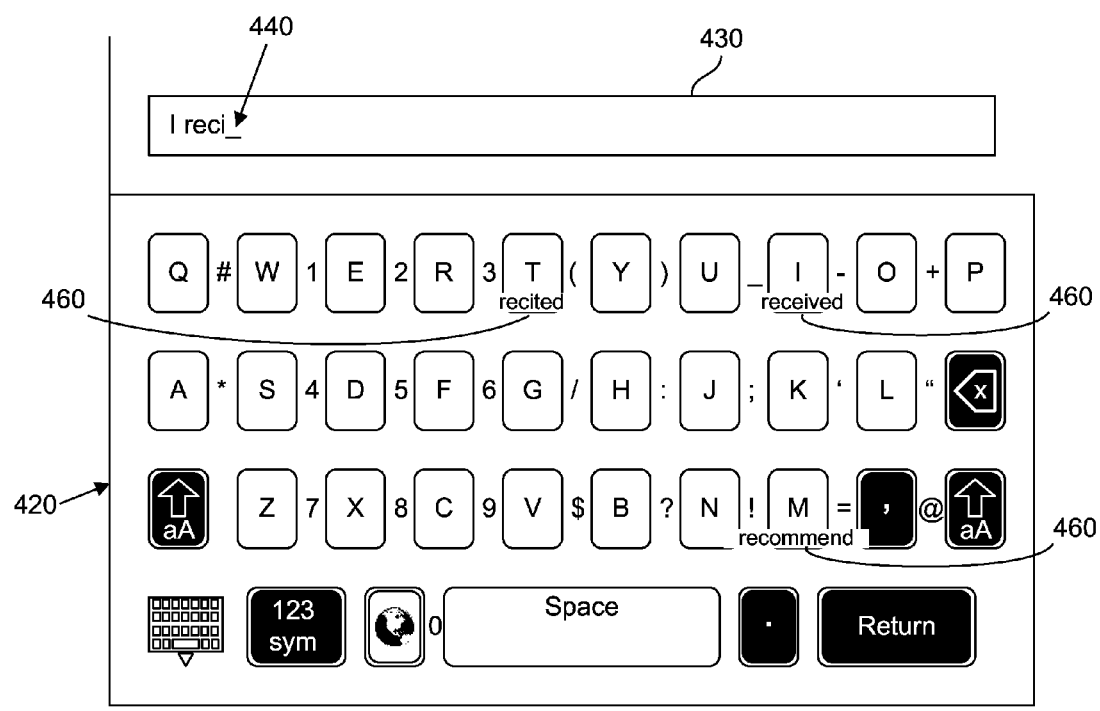
Figure 4C:
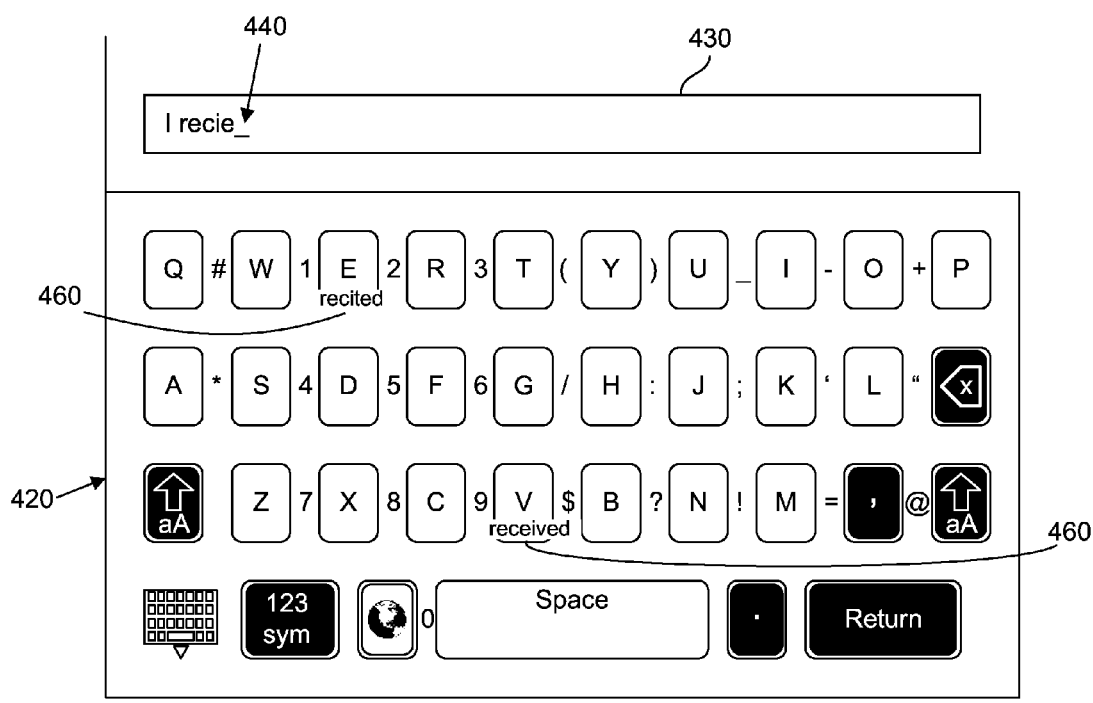

FIGS. 4A-4C illustrate an example in which the user makes a spelling mistake and inputs the word "recieve". In FIG. 4A, electronic device 100 receives the input "I rec" from virtual keyboard 420. After the character "c" is inputted, the predictor determines, based on an input string (which, in some embodiments, is the last partial word of the input received from virtual keyboard 420) three generated strings 460, "received," "recommend," and "reckon," and the processor displays each generated string 460 at a key corresponding to a candidate character in each case. For example, because the last partial word of the input ("rec") currently consists of three characters, the predictor determines the candidate characters to be the fourth character in each generated string: "E", "O", and "K", respectively.

In FIG. 4B, electronic device 100 receives the character "i" as input from virtual keyboard 420 and outputs the character in input field 430. The predictor then generates, based on the new input string, the following generated strings: "received," "recited," and "recommend." In this example, the input string "reci" is a substring of the generated string "recited". The input string "reci" is not a substring of the generated string "recommend", but "recommend" is nevertheless generated by the predictor, for example, because the keys "I" and "O" are closely positioned on the virtual keyboard and the predictor determines that there is high probability of the user accidently selecting "I" instead of "O". The input string "reci" is also not a substring of the generated string "received", but "received" is still generated by the predictor, for example, because the predictor determined that the word "received" is often misspelled as "recieved" by users. In some embodiments the predictor can determine this by accessing a list of common mistakes. Such list can be stored, for example, in memory 110, or on a remote server. The generated strings 460 are displayed at keys corresponding to the candidate characters, in this case, for example, on the fifth character of each generated string, "T", "I", and "M", because the input string ("reci") consists of four characters.

In the above example, if the user is in fact entering the word "recited," after entering "reci" the user's attention will divert to the key "T". Therefore, displaying the generated string "recited" at the key "T" assists the user, because the user can immediately see the generated string and can easily input it, for example, by using a swiping gesture. Similarly, displaying the generated string "recommend" at the key "M" assists a user who is entering the word "recommend" but accidentally touches "I" instead of "O". The user either realizes and corrects the typo, or continues typing, in which case the user's attention shifts to the next intended key, "M", where the user advantageously finds the generated string "recommend".

However, if the user is entering the word "recieved," assuming it to be the correct spelling of the word, after inputting the string "reci" the user's attention naturally shifts to the key "E". In the example embodiment illustrated in FIG. 4B, the user does not find the generated string 460 "received" at that key, since that generated string is displayed at the key "I". That is because "i" is considered by the predictor to be the candidate character for the generated string "received," being the next (fifth) character of the generated string. Thus, when the user makes a mistake that is not, for example, an accidental one-letter typo, the generated string 460 can be displayed at a key that is not in user's focus. Consequently, the user is unlikely to see the generated string and therefore is unlikely to input it.

In FIG. 4C, the user continues to enter the word "recieve" by inputting the character "e". This processor displays the generated string 460 "received" at a key corresponding to a candidate character "v", because "v" is the sixth character within the generated string "received" and the input string "recie" is five characters long.

It should be noted, that because the spelling mistake in this example did not change the length of the entered word, the problem of displaying the generated string at a wrong key was quickly "fixed" once the user typed beyond the misspelled portion of the word. However, the problem can be more pronounced when the mistake changes the length of the word. For example, if the user misspells the word "accommodate" as "acommodate", or if the user misspells the word "harass" as "harrass", the generated string can be displayed at a wrong key for the remainder of the word. Therefore, a method of identifying and adjusting the display location for the generated string is desirable.

Reoccurring Typing Mistakes

Users occasionally repeat spelling mistakes. In some embodiments, the processor can identify a typing mistake, register the mistake in a database, and at a subsequent reoccurrence of the same mistake, place the generated string on the virtual keyboard in accordance with the input received by the user the previous time the mistake occurred.

Figure 5:
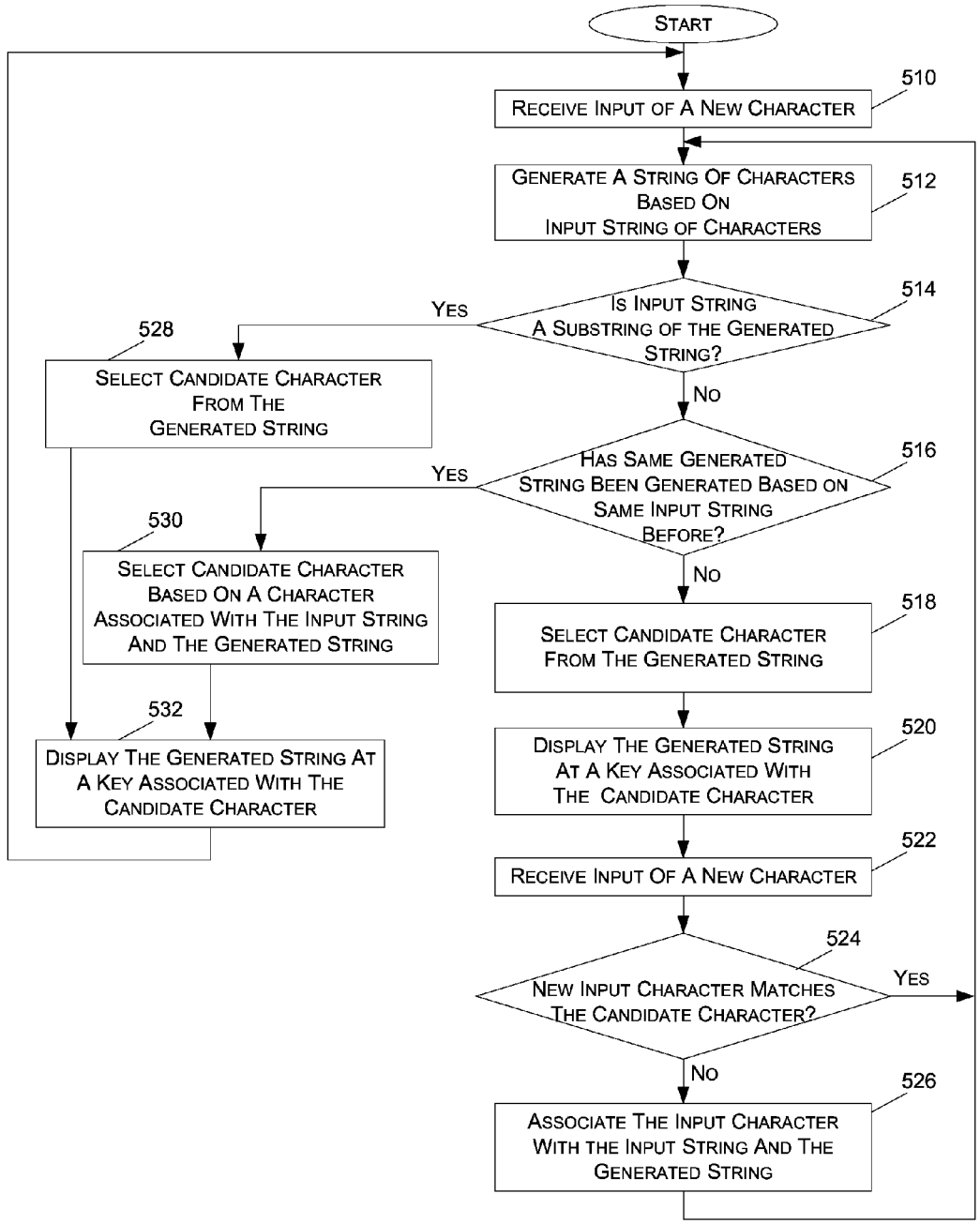
FIG. 5 is a flowchart illustrating an example method for displaying a generated string, consistent with embodiments disclosed herein.

FIG. 5 is a flowchart illustrating example method 500, in accordance with some embodiments. Method 500 can be implemented with a processor, such as main processor 102, and stored on a tangible computer readable medium, such as hard drives, CDs, DVDs, flash memory, and the like. At block 510, the processor receives an input of a new character. At block 512, the processor generates a string based on an input string, where the input string can include the newly received character, as well as some of the previously received characters, if any. For example, the input string can include all new characters received since the last delimiter, such as a space, was received. In some embodiments, generated string is associated with the string of input characters. For example, the processor can generate a string that, based on the input characters, is statistically likely to be the string that the user intends to input.

At block 514, the processor checks whether the input string is a substring of the generated string. If so, the method proceeds to block 528 and the processor selects a candidate character from the generated string. For example, the processor can select the candidate character to be the (N+1)-th character within the generated string, where N is the number of input characters. The processor then displays, at block 532, the generated string on the virtual keyboard at a key corresponding to the selected candidate character.

Alternatively, if the processor determines at block 514 that the input string is not a substring of the generated string (i.e., a possible typing mistake is identified), the processor determines, at block 516, whether the generated string has previously been generated based on the same input string. For example, the processor can access a database (stored in memory 110, at a remote server, or any other location accessible by the processor) and determine whether the database contains an entry associated with the same input string and the same generated string.

If the processor determines that the same string has been previously generated based on the same input string (e.g., the entry is found), the method proceeds to block 530, where the processor selects the candidate character based on that entry. In some embodiments, the entry is associated with a character, such as the character that was received as an input immediately after the same input string was received and the same generated string was previously generated. In these embodiments, the processor selects the associated character to be the candidate character. At block 532, the processor displays the generated string on the virtual keyboard next to the key corresponding to the selected candidate character. The method then restarts at block 510.

If the processor determines, at block 516, that the same generated string has not been previously generated for the same input (e.g., by determining that the database does not contain an entry associated with the same input characters and the same generated string), the processor selects, at block 518, the candidate character from the generated string. For example, the processor can select the candidate character to be the (N+1)-th character within the generated string, where N is the number of characters in the input string. The processor then displays, at block 520, the generated string on the virtual keyboard, at the key corresponding to the selected candidate character, and proceeds to receive an input of a new character at block 522. After receiving a new character, the processor checks, at block 524, whether the new character matches the candidate character, and if so, the method returns to block 512.

Otherwise, the processor associates, at block 526, the input string and the generated string with the new input character. For example, the processor can create a new entry containing the input string, the generated string, and the input character, and add that entry to a database, e.g., the same database that is accessed in blocks 516 and 530. For example, if the input string is "recome," the generated string is "recommend," and the new input character is "n" (the user is typing "recomend" instead of "recommend"), the processor can add to the database a new entry that contains the strings "recome", "recommend", and the character "n". In some embodiments, the processor associates additional information with the input string-generated string combination, such as the number of times this combination occurred, the data and time of last occurrence, the probability that was associated with the generated string, and any other relevant information. The method then returns to block 512.

Figure 6:
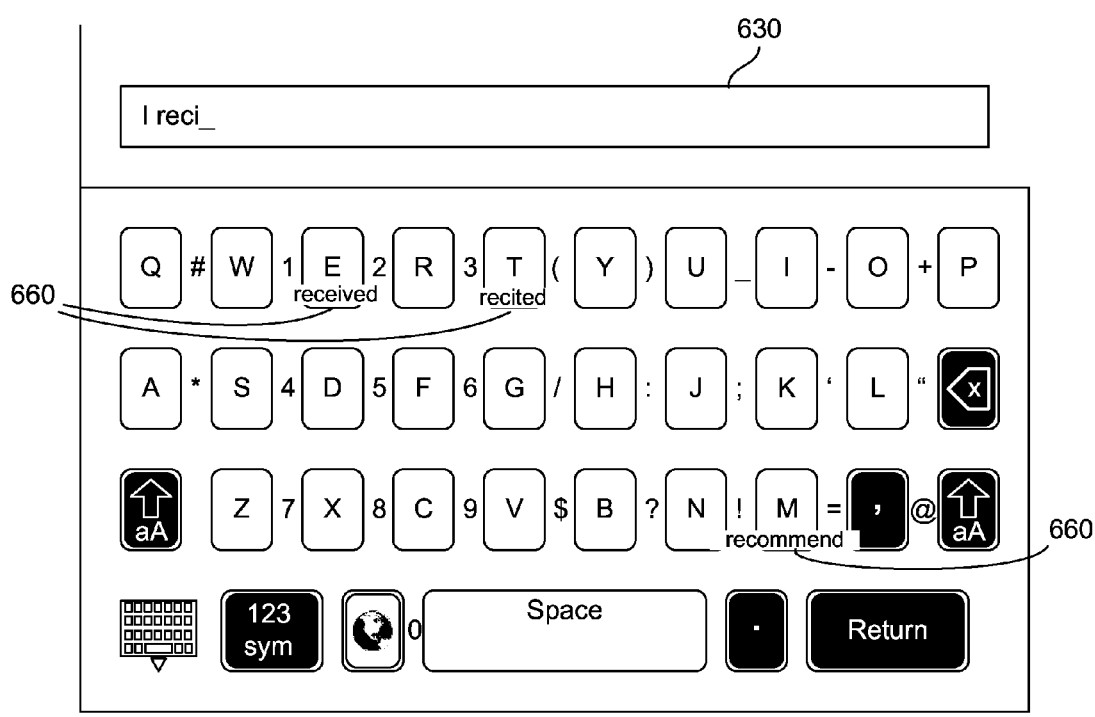
FIG. 6 shows example front view of a touchscreen, consistent with embodiments disclosed herein.

Method 500 can be illustrated, for example, in conjunction with FIGS. 4B-4C, and FIG. 6. In FIG. 4B, input field 430 already contains the characters "I rec" and the user inputs a new character "i". The processor receives (510) the new character, and generates (512) a generated string "received", based on the input string "reci". The processor determines (514) that the input string is not a substring of the generated string and checks (516) whether the same generated string has been previously generated for the same input string. Assuming, for the sake of this example, that it has not, the processor selects (518) the candidate character to be "i", because that is the next (fifth) character within the generated string. The processor therefore displays (520) the generated string "received" at the "I" key on the virtual keyboard, and waits (522) for an input of a new character.

In FIG. 4C, the user inputs a new character "e". The processor determines (524) that the new character "e" does not match the selected candidate character "i" and therefore it stores (526) an entry associated with the strings "reci," "received," and the character "e".

FIG. 6 illustrates an example in which the user types the misspelled word "recieved" for the second time. In FIG. 6 input field 630 again contains the characters "I rec", the processor again receives (510) the input character "i", generates (512) the string "received", and determines (514) that "reci" is not a substring of "received". This time the processor determines (516) that the same generated string has been previously generated for the same input string. For example, the processor accesses the database, searches for an entry associated with the strings "reci" and "received," and finds that entry. Consequently, the method continues to step 530, where the processor selects the candidate character based on the information associated with that entry. For example, the processor selects the candidate character to be the character that is associated with (e.g., stored in) the found entry, which, in this case, is the character "e". Accordingly, the processor displays (532) the generated string 660 "received" at the key "E" on the virtual keyboard. This is in contrast to the previous (first) occurrence of the same input string and the same generated string, illustrated in FIG. 4B, where the generated string was displayed at the key "I".

Thus, when the user repeats the same spelling mistake and once again types "recieved", after typing the character "i" the user shifts the attention to the key "E", where the user sees the generated string "received". The user can then input the generated string, which will place the generated string in the input field, thereby completing the user's input and correcting it at the same time. Thus, a correct prediction of the candidate character results in faster input of the intended text, fewer wasted processing cycles, and as a result, power savings.

Figure 7:
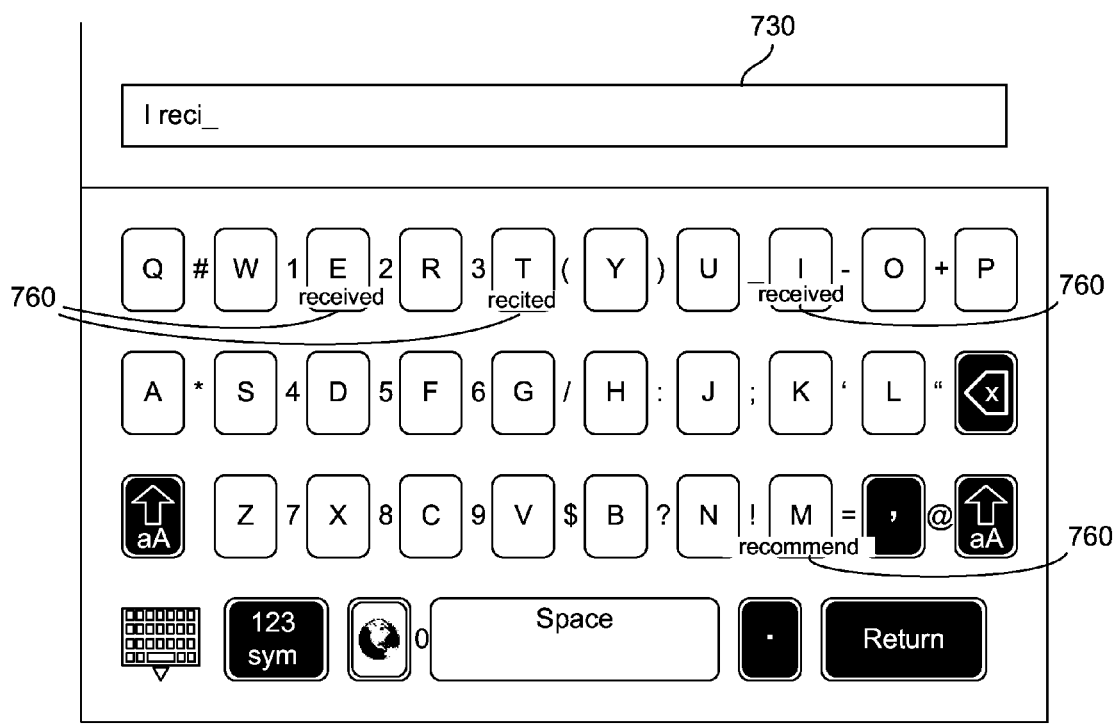
FIG. 7 shows example front view of a touchscreen, consistent with embodiments disclosed herein.

In some embodiments, when the processor determines (516) that the same generated string has been previously generated for the same input string, the processor can select two candidate characters. The first candidate character can be selected (530) based on the information associated with the previously stored database entry, as discussed above, and the second candidate character can be selected (not shown) from the generated string, as at block 516. FIG. 7 illustrates an example in accordance with these embodiments.

In FIG. 7, the user types the misspelled word "recieved" once again. In this example, input field 730 already contains the characters "I rec". The processor receives (510) the input character "i", generates (512) the string "received", and determines (514) that "reci" is not a substring of "received". The processor then determines (516) that the same generated string has been previously generated for the same input string. For example, the processor accesses the database, searches for an entry associated with the strings "reci" and "received," and finds that entry. Consequently, the method continues to step 530, where the processor selects two of the candidate characters. The first candidate character is selected (530) based on the information associated with the found entry. For example, the processor selects the first candidate character to be the character that is associated with the found entry—the character "e". The second candidate character is selected (not shown) from the generated string. For example, the processor selects the second candidate character to be "i", because the input string is four characters long, and "i" is the next (fifth) character within the generated string. Consequently, the processor displays (532) the generated string 760 "received" both at the first and at the second candidate keys: at keys "E" and "I". This can increase the probability that the user will encounter the generated string. In some embodiments, the processor displays the same generated string at a key corresponding to the second candidate ("i" in the above example) only when no other generated string needs to be displayed at that key.

It is noted that in the embodiment illustrated by method 500, the processor does not proceed to database operations (i.e., blocks 526 and 530) if the user simply inputs one wrong character without changing the length of the word, for example, the user inputs "cematery" instead of "cemetery". That is because after the initial typo, the user inputs a correct letter, causing the processor to return from block 524 to block 512 without storing (and subsequently referencing) information regarding this typo. In other embodiments, however, block 524 can be omitted, in which case the processor will store, and subsequently refer to, such single-character typos, as well.

In some embodiments, the processor can remove old entries from the database in order to save memory space. For example, the processor can periodically (or upon reaching a predetermined database memory size) remove all database entries that are associated with mistakes that last occurred before a predetermined point in time, mistakes that have occurred fewer times than a predetermined number of times, or mistakes that correspond to any combination of these or other factors.

In some embodiments, determining, at block 516, whether the same generated string has been previously generated based on the same input string includes determining whether the same string has been previously generated based on the same input string a certain number of times, indicated, for example, by a first threshold. The first threshold can be, for example, 1, 2, 5, or any other positive number. The processor can track the number of occurrences of the specific generated string-input string combinations, for example, by incrementing the corresponding field in the database entry associated with the combination.

In some embodiments, if the user makes the same mistake many times, e.g., more times than indicated by a second predetermined threshold, the processor can decide that this is no longer a mistake, but an alternative acceptable way of typing the specific word. In that case, the processor can add the word to a dictionary (e.g., a default dictionary or a separate "custom" dictionary). The processor can then start using that word as a generated string. For example, if the second predetermined threshold is 10, and the user has typed the word "colour" at least ten times, the processor would be generating the string "color" for the first ten times (assuming that the word "colour" was not in the dictionary). If the user disregards the generated string, i.e., the user does not input it on any of the ten times, the processor can add the word "colour" to the dictionary. The next time the user types the word "colour," the processor can generate either a string "colour" or a string "color". In some embodiments, the second threshold can be higher than the first threshold.

In some embodiments, the added word can be removed from the dictionary, for example, when the user starts using the "color" version again, and disregards the generated string "colour" more than a number of times indicated by a third predetermined threshold.

Other embodiments of the disclosure will be apparent to those skilled in the art from consideration of the specification and practice of the disclosure disclosed herein. It is intended that the specification and examples be considered as examples only, with a true scope and spirit of the disclosure being indicated by the following claims.

What is claimed is:
1. A method comprising:
receiving an input string having a length N from a virtual keyboard;
generating at least one string of characters based on the input string;
responsive to a determination that the generated string was previously generated for a candidate at least a predetermined threshold number of times, other than the most recent time, based on the input string:
when the input string is not a substring of the generated string, selecting a candidate character for the candidate in an N position of the generated string; and
when the input string is a substring of the generated string, selecting a candidate character for the candidate in an N+1 position of the generated string;
responsive to a determination that the generated string was not previously generated for the candidate at least a predetermined threshold number of times, other than the most recent time, based on the input string:
when the input string is not a sub string of the generated string and selecting, by at least one processor, a candidate character for the candidate, wherein selecting the candidate character comprises searching a database and identifying the candidate character that was previously associated with the input string and with the generated string and that is a candidate character in an (N+1) position of the generated string; and
displaying the generated string at a location on or near a virtual key of the virtual keyboard that is associated with the selected candidate character.

2. The method of claim 1, further comprising:
responsive to a determination that the generated string was not previously generated based on the input string, receiving a new input character, and associating the new input character with the input string and the generated string.

3. The method of claim 2, wherein:
associating the new input character comprises storing the association between the new input character, the input string, and the generated string in the database;
the determination that the generated string was previously generated based on the input string comprises accessing the database; and
selecting the candidate character comprises accessing the database.

4. The method of claim 1, wherein generating at least one string based on the input string comprises generating a string that is statistically likely to be the intended input, given the input string.

5. The method of claim 1, wherein the displayed generated string comprises a first displayed generated string, further comprising:
responsive to a determination that the generated string was previously generated based on the input string, selecting a second candidate character as a character in the (N+1) position in the second generated string, wherein N is the length of the input string; and displaying the second generated string on the virtual keyboard at a location that is associated with the second selected candidate character.

6. An electronic device comprising a display having a virtual keyboard rendered thereupon, and a processor, the processor configured to perform:
receiving an input string having a length N from the virtual keyboard;
generating at least one string of characters based on the input string:
when the input string is not a substring of the generated string and was previously generated for a candidate at least a predetermined threshold number of times, other than the most recent time, selecting a candidate character for the candidate in an N position of the generated string;
when the input string is a substring of the generated string and was previously generated for a candidate at least the predetermined threshold number of times, other than the most recent time, selecting a candidate character for the candidate in an N+1 position of the generated string; and
when the input string is not a substring of the generated string and was not previously generated for a candidate at least the predetermined threshold number of times, other than the most recent time, based on the input string, selecting a candidate character for the candidate, wherein selecting the candidate character comprises searching a database and identifying the candidate character that was previously associated with the input string and with the generated string and that is a candidate character in an (N+1) position of the generated string; and
displaying the generated string at a location on or near a virtual key of the virtual keyboard that is associated with the selected candidate character.

7. The electronic device of claim 6, wherein the processor is further configured to perform:
responsive to a determination that the generated string was not previously generated based on the input string, receiving a new input character, and associating the new input character with the input string and the generated string.

8. The electronic device of claim 7, wherein:
associating the new input character comprises storing the association between the new input character, the input string, and the generated string in the database;
the determination that the generated string was previously generated based on the input string comprises accessing the database; and
selecting the candidate character comprises accessing the database.

9. The electronic device of claim 6, wherein generating at least one string based on the input string comprises generating a string that is statistically likely to be the intended input, given the input string.

10. The electronic device of claim 6, wherein the displayed generated string comprises a first displayed generated string, the processor is further configured to perform:
responsive to a determination that the generated string was previously generated based on the input string, selecting a second candidate character as the character in the (N+1) position in the second generated string, wherein N is the length of the input string; and displaying the second generated string on the virtual keyboard at a location that is associated with the second selected candidate character.

11. A non-transitory computer readable medium storing a set of instructions that are executable by an electronic device to cause the electronic device to perform a method, the method comprising:
acquiring an input string having a length N from a virtual keyboard;
generating at least one string of characters based on the input string:
when the input string is not a substring of the generated string and was previously generated for a candidate at least a predetermined threshold number of times, other than the most recent time, selecting a candidate character for the candidate in an N position of the generated string;
when the input string is a substring of the generated string and was previously generated for a candidate at least the predetermined threshold number of times, other than the most recent time, selecting a candidate character for the candidate in an N+1 position of the generated string; and
when the input string is not a substring of the generated string was not previously generated for a candidate at least the predetermined threshold number of times, other than the most recent time, based on the input string, selecting a candidate character for the candidate, wherein selecting the candidate character comprises searching a database and identifying the candidate character that was previously associated with the input string and with the generated string and that is a candidate character in an (N+1) position of the generated string; and
providing the generated string for displaying at a location on or near a virtual key of the virtual keyboard that is associated with the selected candidate character.

12. The non-transitory computer readable medium of claim 11, wherein the method further comprises:
responsive to a determination that the generated string was not previously generated based on the input string, receiving a new input character, and associating the new input character with the input string and the generated string.

13. The non-transitory computer readable medium of claim 12, wherein:
- associating the new input character comprises storing the association between the new input character, the input string, and the generated string in the database;
- the determination that the generated string was previously generated based on the input string comprises accessing the database; and
- selecting the candidate character comprises accessing the database.

14. The non-transitory computer readable medium of claim 11, wherein the determination that the generated string was previously generated based on the input string is a determination that the generated string was previously generated based on the input string more than a predetermined number of times.

15. The non-transitory computer readable medium of claim 11, wherein generating at least one string based on the input string comprises generating a string that is statistically likely to be the intended input, given the input string.

\* \* \* \* \*